United States Patent
Cords et al.

[11] Patent Number: 5,868,160
[45] Date of Patent: Feb. 9, 1999

[54] TWO-WAY INSERT VALVE

[75] Inventors: Karl Cords, Partenstein; Hubert Feser, Gemünden/Main; Karlheinz Hunschede, Marktheidenfeld; Götz-Dieter Machat; Georg Rausch, both of Lohr/Main, all of Germany

[73] Assignee: Mannesmann Rexroth AG, Lohr/Main, Germany

[21] Appl. No.: 913,636

[22] PCT Filed: Feb. 22, 1996

[86] PCT No.: PCT/EP96/00737

§ 371 Date: Sep. 5, 1997

§ 102(e) Date: Sep. 5, 1997

[87] PCT Pub. No.: WO96/29518

PCT Pub. Date: Sep. 26, 1996

[30] Foreign Application Priority Data

Mar. 23, 1995 [DE] Germany ............ 195 10 500.1
Nov. 30, 1995 [DE] Germany ............ 195 44 592.9

[51] Int. Cl.⁶ .............. F15B 13/042; F16K 27/02
[52] U.S. Cl. .............. 137/454.6; 137/495; 251/52
[58] Field of Search ............ 137/454.6, 494, 137/495, 533.29, 538; 251/52

[56] References Cited

U.S. PATENT DOCUMENTS

| 3,095,176 | 6/1963 | Hunt ............. 137/454.6 |
| 5,180,443 | 1/1993 | Voss ............. 137/494 |

FOREIGN PATENT DOCUMENTS

| 0634577 | 1/1995 | European Pat. Off. . |
| 3619927 | 12/1987 | Germany . |
| 3741521 | 2/1989 | Germany . |
| 4218325 | 12/1993 | Germany . |
| 4240838 | 6/1994 | Germany . |
| 9406842 | 7/1994 | Germany . |

OTHER PUBLICATIONS

Machine Design, vol. 52, No. 28, 11 Dec. 1980, Cleveland US, pp. 143–147, XP002009011 David C. Downs.
903 Machine Design, vol. 52, Dec. 11, 1980, Cleveland, Ohio, USA, Cartridge Check Valves: New option for hydraulic control.
The Hydraulic Trainer, vol. 4, Mannesmann Rexroth, 1.89, 1st Edition.
Funktionsbeschreibung und Einsatzhinweis, Rexroth RD 81 056/4.79.
Bosch, 2–way cartridge valves, DIN 24342/ISO 7368, HP/VEK 2–AKY 011/1 De/En/Fr (5.90).
Oilhydraulic and pneumatic; cavities for two–port hydraulic cartridge valves (slip–in valves) DIN 24342, Fluidtechnik.
Einbaumasse für 2–Wege–Einbauventile, Jul. 1979, pp. 1–5.

*Primary Examiner*—Stephen M. Hepperle
*Attorney, Agent, or Firm*—Martin A. Farber

[57] ABSTRACT

A two-way insert valve having an insert assembly which can be installed in a receiving bore hole and having a valve cover for closing the receiving bore hole, the insert assembly consisting of two parts, has a bush with several radial passages and with an axial passage and a ring arranged between the bush and the valve cover and has a valve piston by which a connection between the radial passages and the axial passage can be controlled and which is displaceable in opening direction up to a stop. A closing spring urges the valve piston in closed direction. The valve piston in its closed position is guided by the bush at least approximately up to the first end of the bush facing the ring. In this way, the guidance between the valve piston and the bush, the quality of which is determined essentially by the ratio between the guidance length and the guidance diameter, is still sufficiently good even if the radial passages through the bush and the diameter of the valve piston are made very large in order thereby to obtain large opening cross sections of the valve and thus a low resistance to flow.

15 Claims, 4 Drawing Sheets

1

TWO-WAY INSERT VALVE

FIELD AND BACKGROUND OF THE INVENTION

The present invention relates to a two-way insert valve which has the features set forth in the preamble to Claim 1.

The term "two-way insert valve" is the additional designation for a hydraulic control element according to DIN 24 342. It is also known by the name of logic element or cartridge. In its basic principle, there is concerned a 2/2-way valve and therefore a directional control valve having two working connections and the two switch positions, open and closed. It is therefore designed to be installed in a receiving bore hole in a control block. By suitable control and connection of two-way insert valves, the direction of flow and the size as well as pressure of a stream of liquid can be controlled. The valve can therefore assume directional functions, flow functions, or pressure functions. The technique of the two-way insert valves is described in detail in the bock "Der Hydraulik-Trainer" [The Hydraulic Trainer], Vol. 4, 1st Edition, published by Mannesmann Rexroth GmbH in 1989.

A two-way insert valve consists essentially of an insert assembly which can be installed in the receiving bore hole of the control block and of a valve cover which closes the receiving bore hole. The insert assembly, on its part, comprises a bush-like housing which is arranged fixed in position in the control block and has a plurality of radial passages and an axial passage as well as a valve piston which is displaceable axially in the housing and by which a connection between the radial passages and the axial passage can be controlled and which can be displaced as far as a stop in the open direction. Normally, the insert assembly also includes a closure spring which acts on the valve piston. The bush-like housing can be formed in one piece by a single bush, as is true of the two-way insert valves shown in said book, or of a two-way insert valve known from EP 0 634 577 A1.

In other embodiments, the housing is made in two parts and has a bush in which the radial and axial passages lying in the main stream are located and a ring arranged between the bush and the valve cover. In accordance with the preamble to Claim 1, the invention relates to such a two-way insert valve.

Such a two-way insert valve is already known, for instance, from "RD-Blatt" 81 056/4.79 of Mannesmann Rexroth GmbH, or from the brochure HP/VEK 2-AKY 011/1 Ger/Eng/Fr (5.90) of Robert Bosch GmbH. In both of the previously known two-way insert valves of the bipartite construction, the valve piston is guided axially in the bush and strikes against the ring upon the maximum stroke. In the two-way insert valve in accordance with the "RD-Blatt", the guidance length between the bush and the valve piston is independent of the position at the time of the valve piston and corresponds approximately to the distance of the first end of the bush facing the ring from the radial passages, less the maximum stroke of the valve piston. This follows from an external milling on the valve piston, which milling is in the region of the radial passages in the closed position of the valve piston.

In the two-way insert valve of the Bosch prospectus, the guidance surface on the valve piston extends, in the closed position of the piston, by approximately a distance corresponding to the maximum stroke, into the region of the radial passages of the bush. This has the result that, upon an increase in the stroke of the valve piston, the guidance length is increased and corresponds approximately to the distance of the end of the bush facing the ring from the radial passages when the valve piston is against the ring.

A given nominal size being presupposed, it is endeavored to develop a two-way insert valve that the pressure drop occurring upon the flow of a large amount of pressurized fluid through the valve is very slight.

SUMMARY OF THE INVENTION

Therefore, the object of the invention is further to reduce the resistance to flow in a two-way insert valve having the features set forth in the preamble to Claim 1. In order to achieve this object, in accordance with the body of Claim 1, the valve piston is, in its closed position, guided by the bush at least approximately up to the first end of the bush facing the ring. Thus, the guidance length between the bush and the valve piston can be greater in every position up to the fully open position of the valve piston than in the case of the two-way insert valves in accordance with the RD-Blatt or the prospectus. In particular, when the valve is closed or only slightly open the guidance length is substantially greater than in the case of the known insert valves if one assumes otherwise the same development of the valves with the exception of the feature set forth in the body of Claim 1. A larger guidance length means, on the one hand, that the danger of the canting of the valve piston is reduced and that less leakage takes place through the gap between the guide bush and the valve piston. On the other hand, this means that, in the case of a two-way insert valve, the diameter of the valve piston, and thus also the diameter of the axial passage as well as the dimensions of the radial passages in axial direction of the bush can be increased without the operation of the valve suffering therefrom. In this case, one must assume that, even also in the case of the valves of the prior art, the ratio between the guidance length and the diameter of the valve piston has substantially satisfied the requirements stipulated. Large passages through the bush result in a small resistance to flow of the valve.

To be sure, a development of a two-way insert valve in accordance with the invention, even without additional measures with regard to the size of the passages or the diameter of the valve piston, is advantageous with regard to the leakage along the gap between the bush and the valve piston as well as with regard to the guidance of the valve piston in the bush.

Suitable further developments of a two-way insert valve in accordance with the invention can be noted from the dependent claims.

A particularly preferred embodiment is set forth in this connection, for instance, in Claim 4, according to which the valve cover forms the stop up to which the valve piston can be displaced in the opening direction. In this way, a long guidance length between the valve piston and bush can be combined with a large maximum stroke of the valve piston and a stable stop. In the case of two-way insert valves with a bipartite housing consisting of a bush and a ring, an axial packing by which the control space behind the valve piston is sealed-off from the outside is present between the ring and the cover. A radial packing is present between the bush and the ring which grips over the outside of the bush, whereby leakage between the control space and an annular space present between bush and control block through the gap between bush and ring is prevented. The diameter of the axial packing between ring and valve cover is preferably made smaller than the diameter of the radial packing. In this way, the result is achieved that the control pressure holds the ring on the valve cover. In order now, in the case of a two-way insert valve of the invention, to limit the diameter of the axial packing between ring and valve cover, the ring has, in accordance with Claim 6, an inward protruding collar the inside diameter of which is less than the inside diameter of the bush in the region of the guidance of the valve piston, and the valve piston has an end section which already in the closed position of the valve piston, extends, in the direction towards the valve cover, over the bush and on which the outside diameter of the valve piston is less than the inside diameter of the collar on the ring. By the collar on the ring, the resting surface for an axial packing is widened inwards beyond the inside diameter of the bush. The smaller outside diameter at the end section of the valve piston makes it possible for the valve piston to extend through the inner collar of the ring and come against the cover.

According to Claim 7, the outside diameter of the valve piston at the end section is only slightly less than the inside diameter of the collar on the ring. In this way, at The moment when the end section extends into the inner collar of the ring, a closed chamber filled with pressurized fluid is formed between the valve piston and the ring, from which chamber, upon the further movement of the valve piston, the pressurized fluid can be displaced only via the narrow gap between the end section of the valve piston and the inner collar of the ring. In this way, the striking of the valve piston is hydraulically damped. The thickness of material at the end section of the valve piston can be relatively slight. The danger of solid particles being detached by hard striking of the valve piston and passing into the oil circuit is slight. A hydraulic damping of the striking for the valve piston which results from the development in accordance with Claim 7, is therefore advantageous even without the features contained in the preceding claims, in particular even when the valve piston strikes against the ring.

When the packing diameter of the axial packing between the ring and the cover is, to be sure, less than the diameter of the radial packing between the bush and the ring which grips axially over the outside of the bush but the difference between the packing diameters is only slight, there is no assurance, in all cases, of the ring being pressed against the valve cover by the control pressure which acts in closing direction on the valve piston. There is then the danger of the axial packing traveling into an axial slot which forms between ring and valve collar and becoming worn very rapidly, so that external leakage occurs at the valve.

It has been found that, by a development in accordance with Claim 8, wear of the axial packing can be substantially avoided. By one or more discontinuities, in particular depressions, in a surface of the bush or ring axially opposite the other part, a sticking effect between bush and ring is reduced to such an extent that even a small difference between the packing diameter provides assurance that the ring will always be pressed against the valve cover by the control pressure.

Ordinarily, the bush is provided on its end surface opposite the ring with a bevel which facilitates the pushing together of bush and ring. In accordance with Claim 11, it is seen to it by an open connection between the annular space at the bevel and the inside of the bush, and therefore the rear control space at the valve piston, that the same pressure always prevails in the annular space as in the control space and that the surface on the ring on which the control pressure acts so as to press the ring against the valve cover is reduced only to limited extent by a sticking effect between bush and ring. The open connection can be created via the ring or the bush. In particular, the open connection is also created by a depression which is present in a surface of bush or ring axially opposite the other part and serves to reduce the sticking effect.

In accordance with Claim 12, the outside diameter of the bush is greater in the region of the radial packing between it and the ring which grips over it on the outside than in a section on the other side of the radial passage, the outside diameter of which is determined by the diameter there of the receiving bore hole. By such a development, two things can be obtained. On the one hand, the diameter of the radial packing can then also be made still larger than a diameter of the axial packing between the ring and the valve cover which already is of a large diameter. On the other hand, there is then also present sufficient material in the region of the radial packing on the bush if the diameter of the valve piston is large.

If the diameter of the valve region is large, this means a small wall thickness of the bush in the region of the annular space between it and the control block, provided that the cross section of the annular space is not reduced by an enlargement of the outside diameter of the bush. With a small wall thickness of the bush, there is the danger, particularly in the region of the radial passages, that the bush will be deformed or break.

According to Claims 13 and 14, this danger can be reduced in the manner that the outside diameter of the bush is smaller on one or the other side or on both sides of the radial passages than in the region of these passages.

BRIEF DESCRIPTION OF THE DRAWINGS

With the above and other objects and advantages in view, the present invention will become more clearly understood in connection with a detailed description of a preferred embodiment of a two-way insert valve in accordance with the invention, when considered with the accompanying drawings of which.

DETAILED DESCRIPTION OF THE PREFERRED EMBODIMENT

Figure 1:
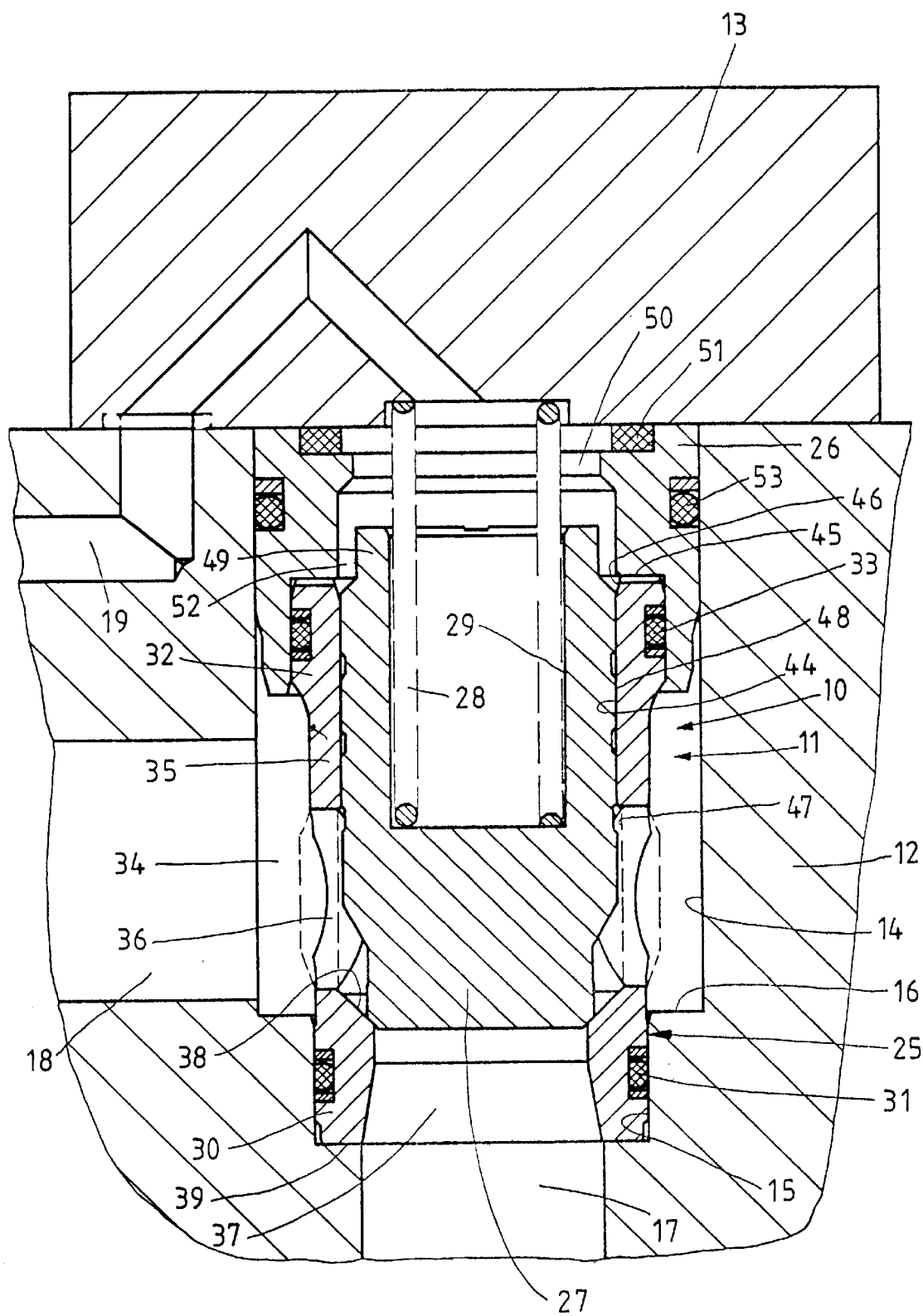
FIG. 1 shows an embodiment of the invention in the closed position of the valve piston, seen in an axial longitudinal section.

The two-way insert valve has essentially an insert assembly 10 which is installed in a receiving bore hole 11 in a control block 12, and a valve cover 13 which, closing the receiving bore hole 11, is fastened on the control block 12 and holds the insert assembly 10 in the receiving bore hole 11. The receiving bore hole is a stepped bore hole the shape and size of which is standardized in Germany by DIN 24 342 as a function of the nominal size of the valve. The section 14 of the receiving bore hole 11 extends from a flat outer surface of the control block 12 and is greater in length and diameter than the second section 15 of the bore hold. The two bore hole sections 14 and 15 pass into each another in a radial shoulder 16.

A first main flow connection 17 for a hydraulic fluid debouches within the control block 12 coaxially into the second bore hole section 15. A second main flow connection 18 debouches within the control block 12 radially, and slightly above the shoulder into the first bore hole section 14. The control block 12 furthermore has a control conduit 19 which continues within the valve cover 12 and debouches within a region of the valve cover left free by the insert assembly towards the receiving bore hole 11 outwards into a control space.

The insert assembly 10 consists—disregarding various packings for the time being—of a bush 25, a ring 26, both of which, if one disregards axial play caused by manufacture, are arranged fixed in place in the control block 12, a valve piston 27 which is located inside the bush and ring, and a closure spring 28 which rests at one end within a blind hole 28 in the valve piston 27 which is open towards the cover 13 and at the other end on the cover 13. The bush 25 is inserted with its end section 30, in which its diameter corresponds to the diameter of the bore hole section 15, into the bore hole section 15 until its end 39 can go no further. Within a circumferential annular groove, the end section 30 receives a radial packing 31 which consists of an elastic middle ring and two support rings on both sides of the middle ring.

By its other end section 32, the bush 25 extends to a radial inner shoulder in the ring 26 which is arranged between the bush 25 and the cover 13 and engages over the end section 32 of the bush 25. Also in the end section 32, the bush 25 is provided on the outside with an annular groove into which a radial packing 33 is inserted, this packing, like the radial packing 31, consisting of an elastic middle ring and two lateral support rings, and it sealing off the radial gap between the bush 25 and the ring 26. In the end section 32, the outside diameter of the bush 25 is greater than in the end section 30. Between the two end sections 30 and 32, the outside diameter of the bush 25 is less than the diameter of the bore hole section 14 so that an annular space 34 results into which the radial main flow connection 18 debouches. In order that the cross section of this annular space 34 be large, the end section 32 of the bush 25 is adjoined by a section 35 in which the outside diameter of the bush corresponds approximately to the outside diameter in the end section 30. Between the section 35 and the end section 30, the bush 25 has four radial holes 36 which are distributed uniformly over its circumference and by which communication is created between the inside of the bush and the annular chamber 34. In the region of the radial holes 36, as indicated by the dashed lines which indicates an axial section between the two radial holes 36, the outside diameter of the bush 25 is greater than in the section 35 and in the end section 30, so that even with large radial holes as in the present case, the danger of the deforming or breaking of the bush is slight. Between the radial holes 36 and an axial passage 37 extending through the end section 30 of the bush 25, the bush 25 has on the inside a conical surface 38 as seat for the valve piston 27. Between the radial holes 36 and the end 45 of a bush 25 facing the ring 26, the inside of the bush 25, except for a short intersection bevel 46, is developed as guide hole for the valve piston 27. In the region of the radial holes 36, the inside diameter of the bush 25 is enlarged somewhat by a circumferential notch 47 as compared with the inside diameter in the region of the guidance for the valve piston.

In the closed position of the valve piston 27 shown in FIG. 1, its circular-cylindrical outer guidance surface 48 extends approximately from the end 45 of the bush 25 to approximately the center of the notch 47, as a result of which, the outer guidance surface 48 extends beyond the guide hole 44 of the bush 25 by approximately the maximum stroke of the valve piston 27. The valve piston 27 tapers towards the end facing the valve seat 38 and therefore sits with a circular control edge on the valve seat 38 the diameter of which is smaller than the diameter of the valve piston 27 in the region of the outer guidance surface 48. Towards the cover 13, the valve piston 27 extends beyond the bush 25 by an end section 49 in which the outside diameter of the valve piston is less than in the region of the outer guidance surface 48 so that it is possible for the valve piston 27 to extend by its end section 49 through an inner collar 50 of the ring 26 and strike against the cover 13. The clear distance of the valve piston 27 in its closed position from the cover 13 determines the maximum stroke of the valve piston, a corresponding free space being, of course, present between the valve piston 27 and the ring 26. The inner collar 50 on the ring 26 enlarges radially inward the resting surface on the ring 26 for an axial packing 51 acting between the ring and the cover 13, the diameter of said packing being less than the diameter of the radial packing 33. Since the outside diameter of the valve piston 27 at the end section 49 is only slightly less than the inside diameter of the ring 26 in the region of the inner collar 50, the collar 50 furthermore brings it about that hydraulic fluid is enclosed in an annular space 52 between the ring 26 and the valve piston 27, which fluid must, upon the further displacement of the valve piston 27 towards the cover 13, be displaced through the narrow gap between the end section 49 of the valve piston 27 and the inner collar 50 of the ring 26, so that the movement of the valve piston 27 and the striking thereof against the cover 13 are hydraulically damped.

For the sake of completeness, reference is also had to the radial packing 53 which lies in an outside groove in the ring 26 and acts between the ring 26 and the control block 12. It therefore seals the annular chamber 34 at the axial gap between the control block 12 and the cover 13, and thus form the outside.

The two-part development of the insert assembly with bush 25 and ring 25 has the advantage that the ring 26 is acted on in the direction towards the cover 13 both by a pressure in the annular chamber 34 and by a control pressure which prevails in the control space between the cover 13 and the valve piston 27, so that the axial packing 51 and the radial packing 53, both of which act toward the outside, are only statically loaded and the danger of leakage towards the outside is slight. That the control pressure also acts on the ring 26 in the direction towards the cover 13 is due to the fact that the diameter of the radial packing 33 is greater than the diameter of the axial packing 51. The relationship between the diameters of the packings 51 and 33 is therefore maintained also in the embodiment shown of a two-way insert valve in accordance with the invention, in which the valve piston 27 strikes against the cover 13.

Figure 4:
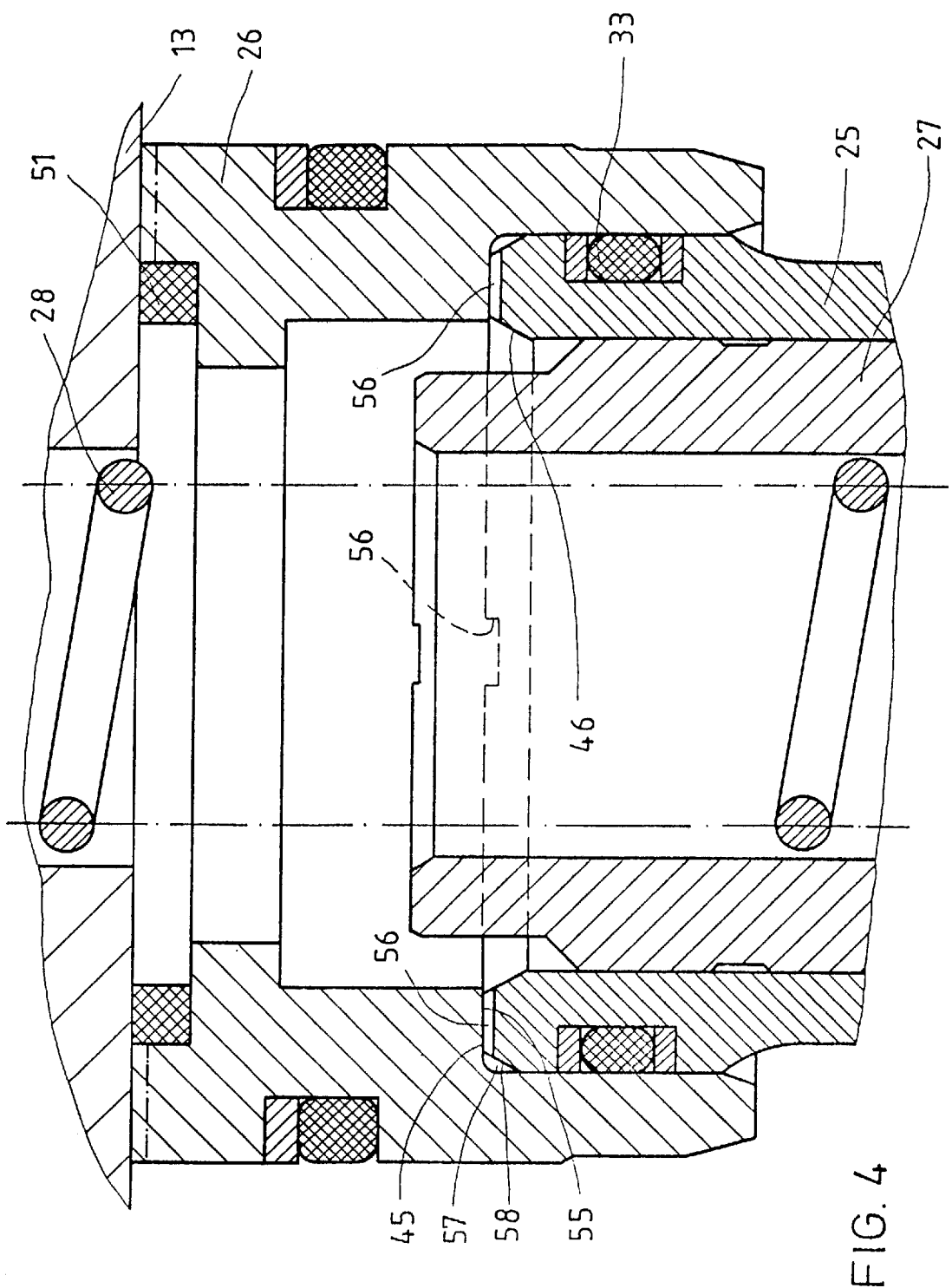
FIG. 4 shows an enlarged portion of FIG. 1.

There is now the possibility to be sure that, due to a sticking effect between the bush 25 and the ring 26, which can rest against each other by the end surface 45 of the bush and the inner shoulder surface 55 of the ring, the total surface of the ring on which a control pressure prevailing within the insert assembly acts in the sense of pressing the ring 26 against the cover 13, becomes smaller than the surface on which the control pressure acts in the opposite direction. The ring 26 is then pressed away from the cover 13. An axial gap, as shown in dash-dot line in FIG. 4, is produced between ring and cover and the axial packing 51 moves into said slot when control pressure is present. The axial packing 51 then wears out very rapidly.

In order to avoid this, several grooves 56 are arranged in the end surface 45 of the bush 25 in the embodiment shown, through which grooves a sticking effect between the end surface 45 of the bush 25 and the inner shoulder surface 55 of the ring 26 is substantially avoided. It is also advantageous in this connection that by the grooves 56, an open communication is created between the inside of the bush 25 and of the ring 26 and an annular space 57 which, due to a bevel 58 on the outside of the end surface 45 of the bush 25, is formed between the bush 25 and the ring 26. Thus, the same pressure as in the inside of bush and ring prevails in the annular space 57, even if the surfaces 45 and 55 should rest against each other. In corresponding manner, the active surface in the sense of the pressing of the ring 26 against the cover 13 is enlarged.

Instead of the groove 56 a spiral groove can also be provided in the end surface 45 of the bush 25, it extending from the inside to the outside of the bush. Such a spiral groove can be easily produced.

The closed position shown in FIG. 1 is assumed by the valve piston 27 when the sum of the force of the closure spring plus the force which a control pressure produces on a circular-cylindrical surface the diameter of which corresponds to the diameter of the guidance surface 48 is greater than the sum of the force which a pressure in the main flow connection 27 produces on a circular surface having the diameter of the seat plus the force which a pressure in the annular chamber 34 exerts on an annular surface the outside diameter of which corresponds to the diameter of the guidance outer surface 48 and the inner diameter of which corresponds to the diameter of the seat. If the control space is relieved into a tank, then both the pressure in the annular chamber 34 and a pressure in the main flow connection 17 can lift the valve piston 27 off from the valve seat 38 provided that the pressure is merely great enough to overcome the force of the closure spring 28. The valve piston 27 lifts off from the valve seat 38, its guidance outer surface 48 extending beyond the end 45 of the bush 25. The guidance length, however, does not change in this connection, since the guidance outer surface 48 on the valve piston 27 is longer than the guidance hole 44 of the bush 25. Over the entire path of the valve piston 27, the guidance length is therefore determined by the length of the guidance hole 44 and is constant.

Figure 2:
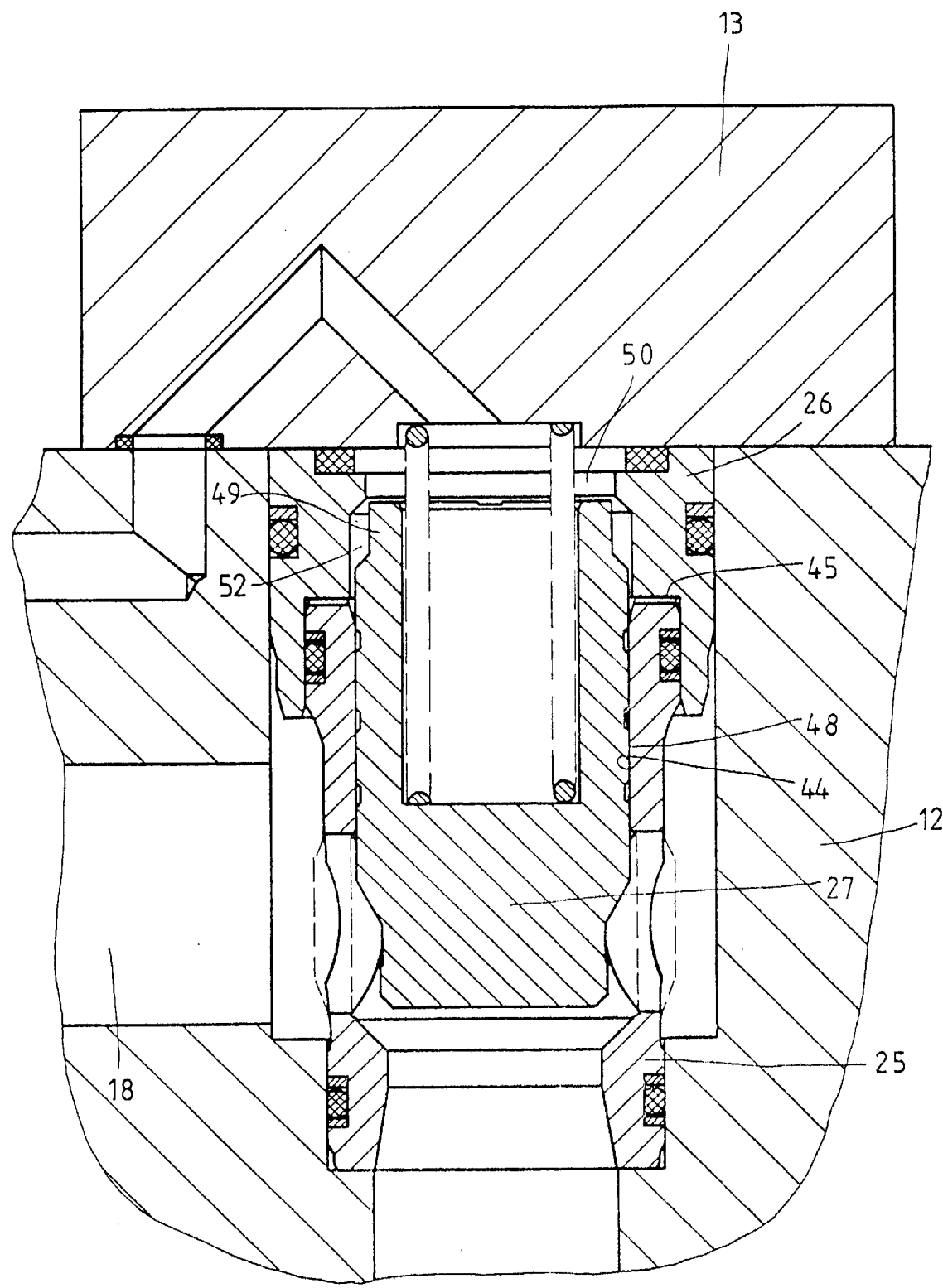
FIG. 2 shows the embodiment with the valve piston, half open, in the section as in FIG. 1.

In the position shown in FIG. 2, the end section 49 of the valve piston 27 is starting to extend into the inner collar 50 of the ring 26. In this way, the volume of oil in the annular space 52 is enclosed and must be displaced via the narrow gap between the end section 49 and the inner collar 50. The movement of the valve piston 27 now continues damped.

Figure 3:
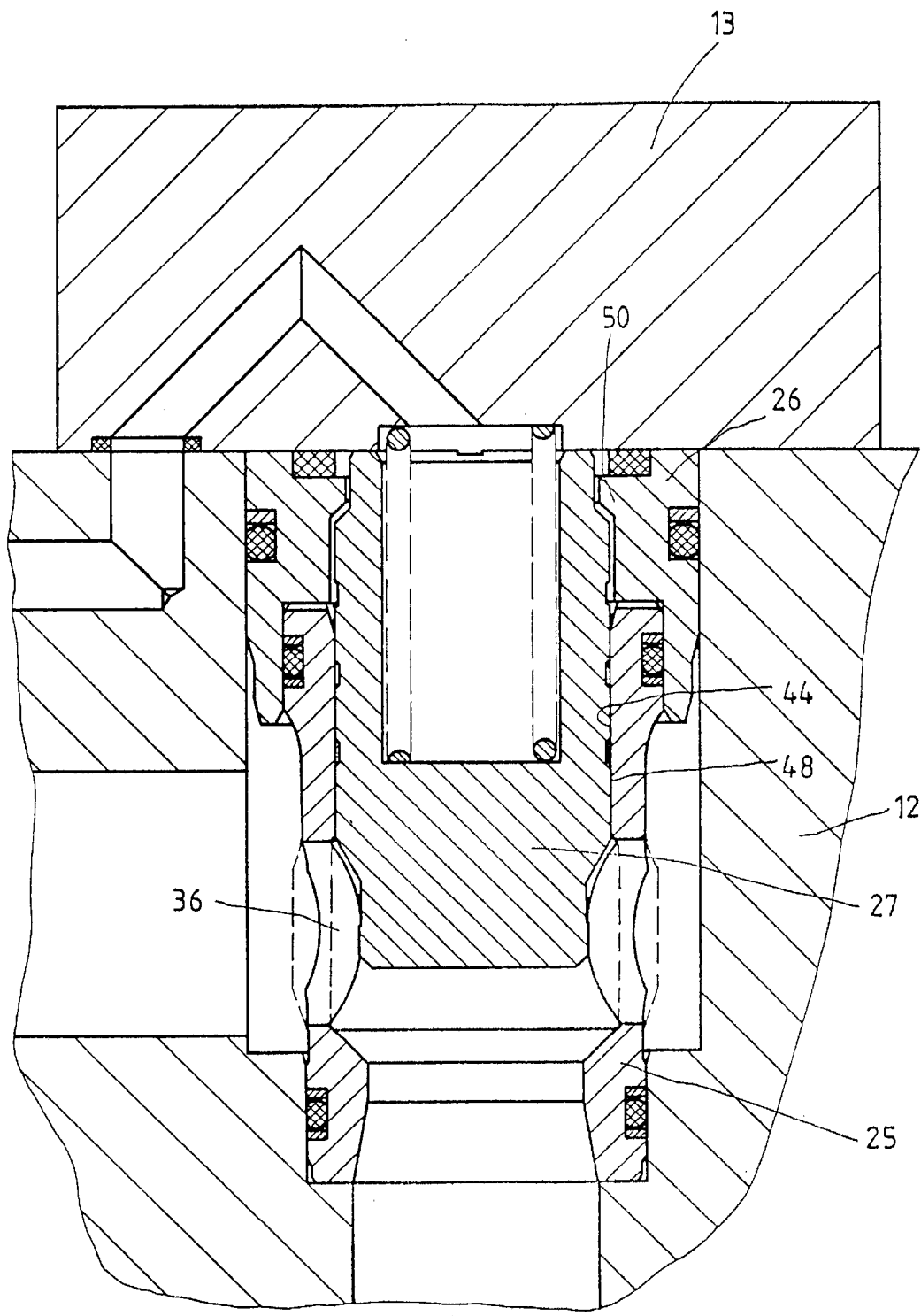
FIG. 3 shows the embodiment with the valve piston entirely open, in the same longitudinal section as in FIG. 1.

In the showing of FIG. 3 finally, the valve piston 27 has effected its maximum stroke and has struck against the cover 13. It can be seen that there is still a space axially between the valve piston 27 and the inner collar 50 of the ring 26 and the ring 26 therefore does not prevent the valve piston 27 from striking against the cover 13. It can furthermore be noted in FIG. 3 that the guidance outer surface 48 of the valve piston 27 now ends approximately with the guidance hole 44 of the bush 25 at the radial holes 36. In the closed position of the valve piston, the guidance outer surface 48 on the valve piston 27 therefore extends beyond the guidance bore hole 44 by approximately the maximum stroke.

We claim:

1. A two-way insert valve having an insert assembly (10) which can be installed in a receiving bore hole (11) and having a valve cover (13) for closing the receiving bore hole (11), in which connection the insert assembly (10), which comprises two parts, has a bush (25) with at least one radial passage (36) and with an axial passage (37) and a ring (26) which is arranged between the bush (25) and the valve cover (13), and has a valve piston (27) by which a connection between the at least one radial passage (36) and the axial passage (37) can be controlled and which is displaceable in opening direction up to a stop (13), wherein the valve piston (27) is, in its closed position, guided by the bush (25) at least approximately up to the first end (45) of the bush (25) which faces the ring (26).

2. A two-way insert valve according to claim 1, wherein a guidance surface (48) on the valve piston (27) is longer than the guidance surface (44) on the bush (25) and extends in the closed position of the valve piston (27) up into the region of the radial passage (36) of the bush (25).

3. A two-way insert valve according to claim 2, wherein the guidance surface (48) on the valve piston (27) extends, in the closed position of the piston, into the region of the radial passage (36) of the bush (25) preferably by a distance corresponding approximately to the maximum stroke of the valve piston (27).

4. A two-way insert valve according to claim 1, wherein the valve cover (13) forms the stop up to which the valve piston (27) is displaceable in the opening direction.

5. A two-way insert valve according to claim 1, wherein an axial packing (51) is arranged between the ring (26) and the valve cover (13) and a radial packing (33) is arranged between the bush (25) and the ring (26) which grips axially around the outside of the bush, and the diameter of the axial packing (51) is smaller than the diameter of the radial packing (33).

6. A two-way insert valve according to claim 5, wherein the ring (26) has an inward protruding collar (50) the inside diameter of which is smaller than the inside diameter of the bush (25) in the region of the guidance of the valve piston (27), and that the valve piston (27) has an end section (49) which, already in the closed position of the valve piston (27), extends beyond the bush (25) in the direction towards the valve cover (13) and on which the outside diameter of the valve piston (27) is smaller than the inside diameter of the collar (50) on the ring 26.

7. A two-way insert valve, according to claim 5, wherein the ring (26) has an inward protruding collar (50) the inside diameter of which is smaller than the inside diameter of the bush (25) in the region of the guidance of the valve piston (27), and the valve piston (27) has an end section (49) which, already in the closed position of the valve piston (27), extends beyond the bush (25) in the direction towards the valve cover (13) and on which the outside diameter of the valve piston (27) is only slightly smaller than the inside diameter of the collar (50) on the ring (26), so that a hydraulic damping of the striking is obtained for the valve piston (27).

8. A two-way insert valve according to claim 5, wherein one of the two parts, bush (25) or ring (26), has a discontinuity (56) in a surface (45) which is axially opposite the other part and can be contacted by the other part.

9. A two-way insert valve according to claim 8, wherein as a result of the discontinuity (56), an open communication is formed between the inside and the outside of the bush (25).

10. A two-way insert valve, according to claim 9, wherein the discontinuity is formed by a groove (56) in the end surface (45) of the bush (25) lying opposite the ring (26).

11. A two-way insert valve according to claim 5, wherein the bush (25) is provided at its end surface (45) opposite the ring 26) on the outside with a bevel, and that an open communication exists between the annular space (57) between the bush (25) and ring (26) at the bevel (58) and the inner side of the bush (25).

12. A two-way insert valve according to claim 1, wherein between the bush (25) and the ring (26) which grips over the outside of the bush (25), there is a radial packing (33) received by the bush (25), and in the region of the radial packing (33) the outside diameter of the bush (25) is greater than in a section (30) on the other side of the radial passage (36).

13. A two-way insert valve according to claim 1, wherein the outside diameter of the bush (25) in the region of the radial passage (36) is greater than between the radial passage (36) and the second end (39) of the bush (25) facing away from the ring (26).

14. A two-way insert valve according to claim 1, wherein the outside diameter of the bush (25) is smaller in a region which, in the direction towards the first end (45) which faces the ring (26), adjoins the region of the radial passage (36) than in the region of the radial passage (36).

15. A two-way insert valve according to claim 1, further comprising a closing spring (28) which acts on the valve piston (27).

\* \* \* \* \*